(12) United States Patent
Ge

(10) Patent No.: US 6,934,634 B1
(45) Date of Patent: Aug. 23, 2005

(54) ADDRESS GEOCODING

(75) Inventor: Xianping Ge, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 10/664,902

(22) Filed: Sep. 22, 2003

(51) Int. Cl.⁷ ............................................. G06F 19/00
(52) U.S. Cl. ............................................. 702/2; 702/5
(58) Field of Search ....................................... 702/2–18

(56) References Cited

U.S. PATENT DOCUMENTS

| | | | | |
|---|---|---|---|---|
| 4,870,576 A | * | 9/1989 | Tornetta | 705/1 |
| 5,032,989 A | * | 7/1991 | Tornetta | 705/1 |
| 5,042,667 A | * | 8/1991 | Keough | 209/3.1 |
| 5,592,375 A | * | 1/1997 | Salmon et al. | 705/7 |
| 5,745,751 A | * | 4/1998 | Nelson et al. | 707/104.1 |
| 5,796,634 A | * | 8/1998 | Craport et al. | 702/150 |
| 5,839,088 A | * | 11/1998 | Hancock et al. | 701/213 |
| 5,878,126 A | * | 3/1999 | Velamuri et al. | 379/219 |
| 5,961,572 A | * | 10/1999 | Craport et al. | 701/207 |
| 5,978,747 A | * | 11/1999 | Craport et al. | 702/150 |
| 6,101,496 A | * | 8/2000 | Esposito | 707/6 |
| 6,343,290 B1 | * | 1/2002 | Cossins et al. | 707/10 |
| 6,366,851 B1 | * | 4/2002 | Chojnacki et al. | 701/208 |
| 6,701,307 B2 | * | 3/2004 | Himmelstein et al. | 707/3 |
| 2001/0020235 A1 | * | 9/2001 | Game | 707/1 |
| 2001/0049677 A1 | * | 12/2001 | Talib et al. | 707/3 |
| 2002/0035432 A1 | * | 3/2002 | Kubica et al. | 702/5 |
| 2002/0054082 A1 | * | 5/2002 | Karpf | 345/738 |
| 2002/0069312 A1 | * | 6/2002 | Jones | 711/100 |
| 2002/0078035 A1 | * | 6/2002 | Frank et al. | 707/3 |
| 2003/0061211 A1 | * | 3/2003 | Shultz et al. | 707/3 |
| 2003/0083073 A1 | * | 5/2003 | Cossins et al. | 455/446 |
| 2003/0140064 A1 | * | 7/2003 | Klein | 707/104.1 |
| 2003/0182394 A1 | * | 9/2003 | Ryngler et al. | 709/217 |
| 2004/0008225 A1 | * | 1/2004 | Campbell | 345/764 |
| 2004/0034666 A1 | * | 2/2004 | Chen | 707/104.1 |
| 2004/0078750 A1 | * | 4/2004 | Frank | 715/500 |

* cited by examiner

Primary Examiner—Donald McElheny, Jr.
(74) Attorney, Agent, or Firm—Harrity & Snyder LLP

(57) ABSTRACT

A geocoding component generates geographic coordinate information, such as latitude and longitude values, for postal addresses. A table includes a number of rows, each corresponding to one or more addresses. The geocoding component can quickly locate a particular row in the table based on a number of input address identifiers as the intersection of the sets rows that correspond to each of the address terms. The geocoding component may operate on addresses that are received by the geocoding component or extracted from documents.

28 Claims, 6 Drawing Sheets

| State | County | City | Zip Code | Street Base-name | Street | Parity | Starting Street Number | Ending Street Number | Starting Latitude | Starting Longitude | Ending Latitude | Ending Longitude |
|---|---|---|---|---|---|---|---|---|---|---|---|---|
| ... | ... | ... | ... | ... | ... | ... | ... | ... | ... | ... | ... | ... |
| CA | Santa Clara | Mountain View | 94043 | Bayshore | Bayshore Pkwy | 0 | 2100 | 2640 | 37.4227 | -122.0945 | 37.4274 | -122.09937 |
| ... | ... | ... | ... | ... | ... | ... | ... | ... | ... | ... | ... | ... |

FIG. 4

US 6,934,634 B1

ADDRESS GEOCODING

BACKGROUND OF THE INVENTION

A. Field of the Invention

The present invention relates generally to networks, and more particularly, to geolocation information associated with resources on a network.

B. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web documents in which a user is interested. Generally, search engines base their determination of the user's interest on search terms (called a search query) entered by the user. The goal of the search engine is to provide links to high quality, relevant results to the user based on the search query. Typically, the search engine accomplishes this by matching the terms in the search query to a corpus of pre-stored web pages. Web documents that contain the user's search terms are "hits" and are returned to the user.

Some web documents may be of particular interest to users that reside in certain geographical areas. For example, web documents associated with an on-line newspaper may be of most relevance to the geographical area covered by the newspaper. Web documents associated with local businesses or organizations are additional examples of web documents that may be of particular interest to a geographical area. Thus, it can be desirable for a search engine to know whether a web document has geographical significance and when it does, the geographical locations associated with the web document.

Web documents often include postal addresses. In some situations, the postal addresses may help to define the geographical relevance of the web document. More specifically, a postal address can be converted to a geographic coordinate (e.g., latitude and longitude) value. The geographic coordinate can be used to calculate the distance between two locations. In the context of web documents and web searching, a geographically distant web document may be determined to be less relevant than a closer web document.

Extracting valid addresses from web documents and efficiently geocoding them (i.e., converting the address to geographic coordinate values) can be a difficult problem. Extracting postal addresses can be difficult because addresses can be written in a number of different formats and may not even be complete addresses. The zip code, for example, may be omitted from an address.

In addition to extracting valid postal address information, accurately and efficiently geocoding the postal addresses can be difficult. Ideally, the geocoding should be able to handle all postal addresses, produce geographic coordinate information that is as close to the actual address as possible, and be able to quickly generate the geocode information.

Accordingly, there is a need in the art to be able to associate documents with geographic locations by efficiently extracting and geocoding postal addresses.

SUMMARY OF THE INVENTION

One aspect of the invention is directed to a method for generating geographic coordinate information that includes receiving at least one term that specifies an address and accessing a table defining coordinate information for ranges of addresses to find an intersection of sets of rows in the table that correspond to the at least one term. The method further includes reading geographic coordinate information from the table at the intersection of the sets of rows in the table.

A second aspect of the invention is directed to a system for geocoding postal addresses. The system includes a table including rows that each correspond to a range of one or more addresses. Each of the rows include fields that define the row. A geocoding component generates geographic coordinate information for a received address specified by one or more terms that correspond to the fields by locating at least one row in the table that corresponds to an intersection of a number of sets of rows defined by the terms in the received address.

Yet another aspect of the invention is directed to a method for extracting addresses from a document. The method includes identifying possible address terms based on predetermined rules, verifying that the identified possible address terms are address terms by comparing the address terms to a table containing known addresses, and examining a relative position of the verified possible address terms in the document to determine whether the verified possible address terms form a valid address.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 4 is a diagram illustrating an exemplary implementation of a table used by the geocoding component shown in FIG. 3;

DETAILED DESCRIPTION

The following detailed description of the invention refers to the accompanying drawings. The detailed description does not limit the invention.

As described herein, a geocoding component includes a table of sorted address fields that allow the geocoding component to efficiently associate postal addresses with address coordinate values (e.g., latitude and longitude values). The geocoding component may receive the postal addresses to geocode from another component or the geocoding component may itself extract the postal addresses from text documents.

Exemplary Network Overview

Figure 1:
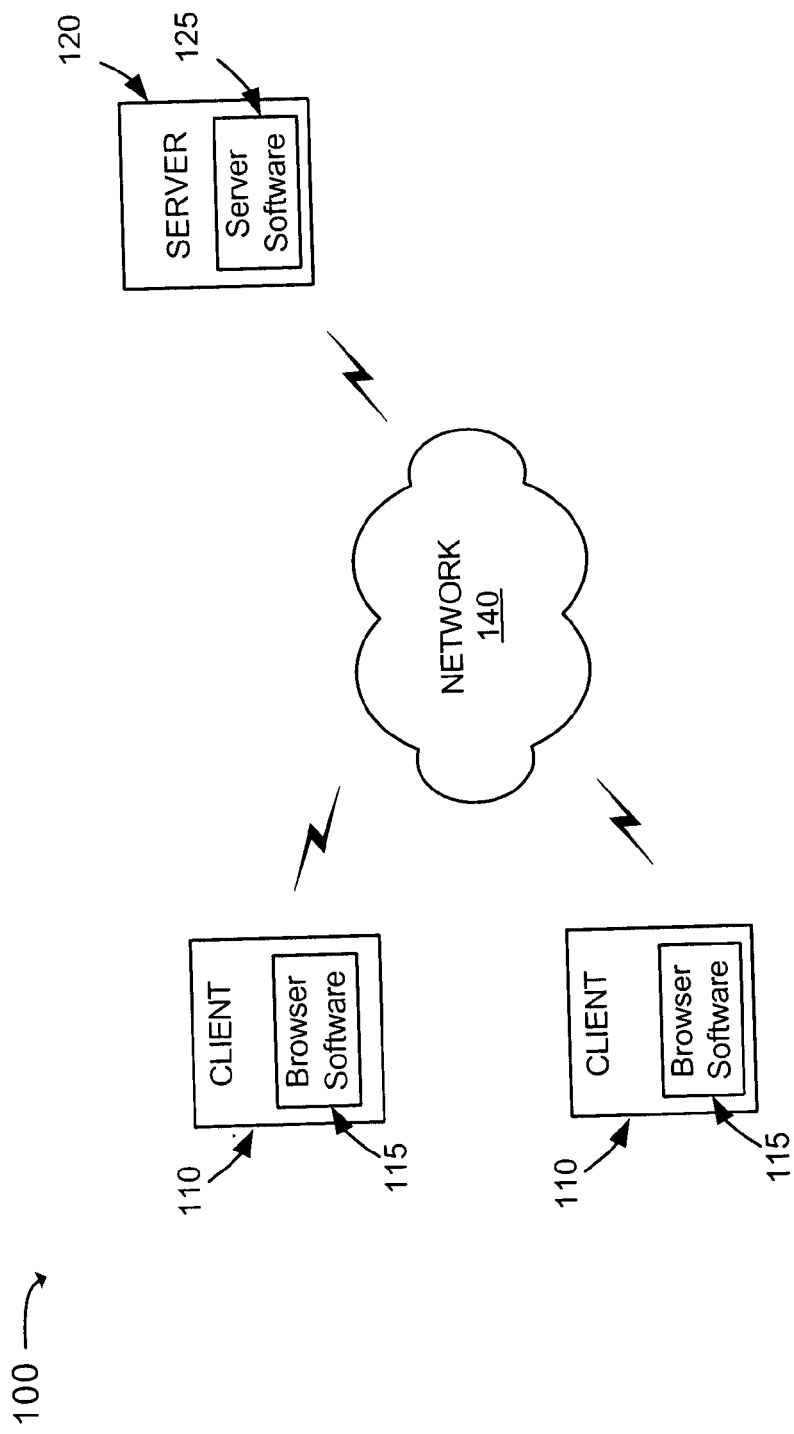
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to one or more servers 120 via a network 140. Network 140 may include a local area network (LAN), a wide area network (WAN), a telephone network, such as the Public Switched Telephone Network (PSTN), an intranet, the Internet, or a combination of networks. Two clients 110 and a server 120 have been illustrated as connected to network 140 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these device. Server 120 may include server entities that process, search, and/or maintain documents in a manner consistent with the principles of the invention. Clients 110 and server 120 may connect to network 140 via wired, wireless, or optical connections.

Clients 110 may include client software such as browser software 115. Browser software 115 may include a web browser, such as the Microsoft Internet Explorer or Netscape Navigator browser. For example, when network 140 is the Internet, clients 110 may navigate the web via browsers 115.

Server 120 may operate as a web server and include appropriate web server software 125. In one implementation, web server software 125 may function as a search engine, such as a query-based web page search engine. In general, in response to client requests, search engine 125 may return sets of documents to clients 110. The documents may be returned to clients 110 as a web page containing a list of links to web pages that are relevant to the search query. This list of links may be ranked and displayed in an order based on the search engine's determination of relevance to the search query. Although server 120 is illustrated as a single entity, in practice, server 120 may be implemented as a number of server devices.

A document, as the term is used herein, is to be broadly interpreted to include any machine-readable and machine-storable data. A document may be an e-mail, a file, a combination of files, one or more files with embedded links to other files, a news group posting, a web advertisement, etc. In the context of the Internet, a common document is a Web page. Web pages often include content and may include embedded information (such as meta information, hyperlinks, etc.) and/or embedded instructions (such as Javascript, etc.).

Exemplary Client/Server Architecture

Figure 2:
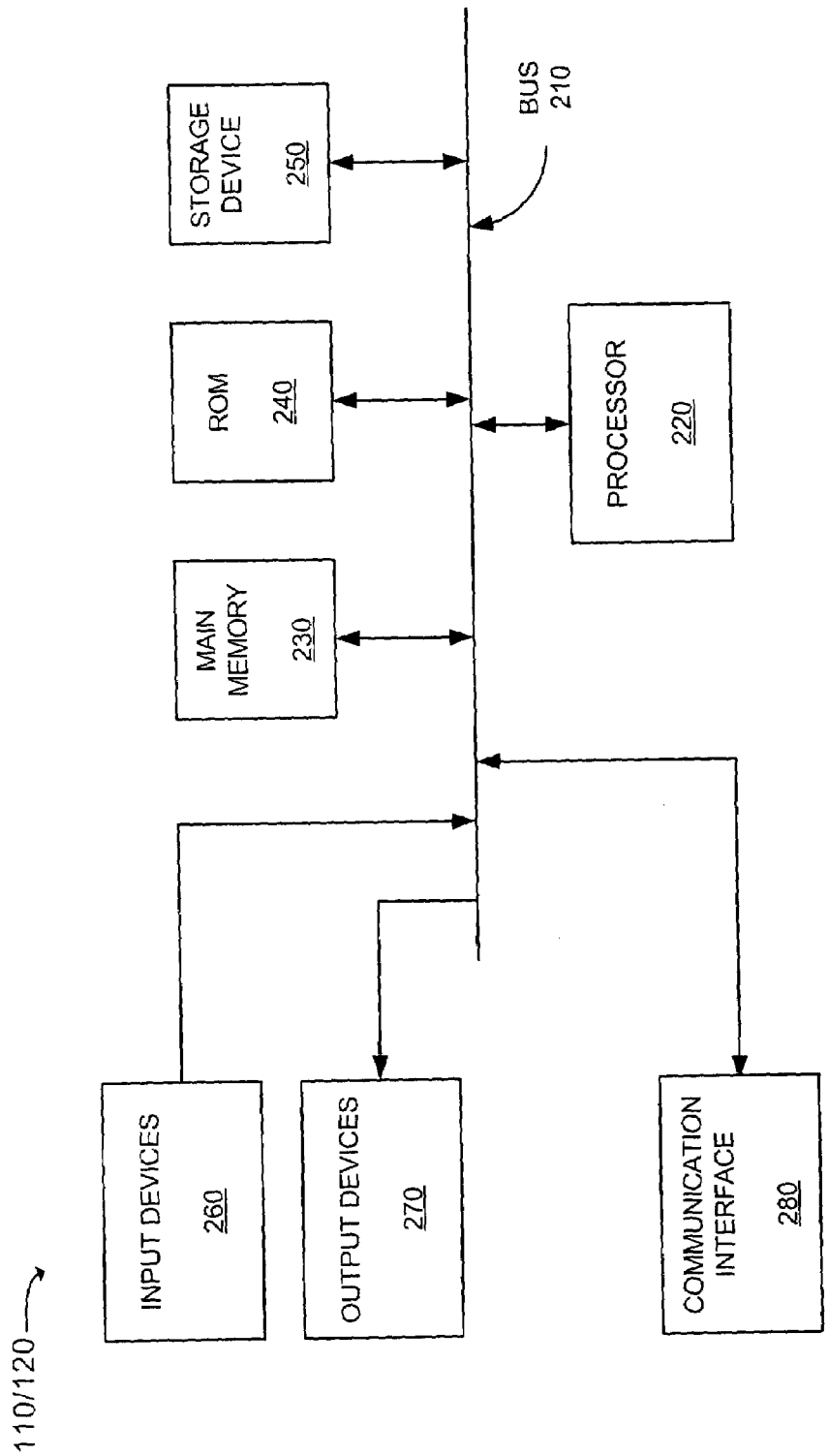
FIG. 2 is an exemplary diagram of a client or server device according to an implementation consistent with the principles of the invention.

FIG. 2 is an exemplary diagram of a client 110 or server 120 according to an implementation consistent with the principles of the invention. Client/server 110/120 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of client/server 110/120.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit a user to input information to client/server 110/120, such as a keyboard, a mouse, a pen, voice recognition and/or biometric mechanisms, etc. Output device(s) 270 may include one or more conventional mechanisms that output information to the user, including a display, a printer, a speaker, etc. Communication interface 280 may include any transceiver-like mechanism that enables client 110 to communicate with other devices and/or systems. For example, communication interface 280 may include mechanisms for communicating with another device or system via a network, such as network 140.

The software instructions defining server software 125 and browser software 115 may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

As mentioned, server software 125 may implement a search engine that, based on a user query, returns a list of links to documents that the server software considers to be relevant to the search. Server software 125 may return additional information to the user, such as web advertisements and descriptive information summarizing the documents in the list of links. Consistent with aspects of the invention, server software 125 may perform geocoding functions.

Server Software 125

Figure 3:
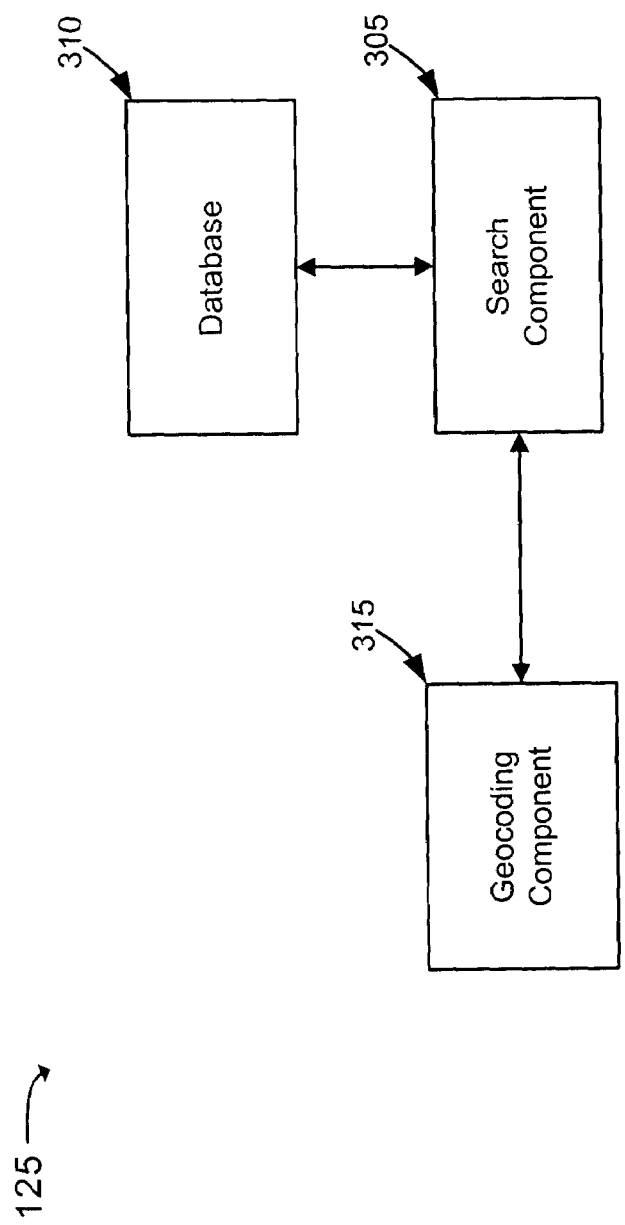
FIG. 3 is an exemplary functional block diagram illustrating an implementation of the server software shown in FIG. 1.

FIG. 3 is an exemplary functional block diagram illustrating an implementation of server software 125. Server software 125 may include a search component 305, a database component 310, and a geocoding component 315. In general, search component 305 may receive user search queries from clients 110, search database 310 based on the search queries, and return lists of links (e.g., URLs) of relevant documents to clients 110. A list of links may also include information that generally attempts to describe the contents of the web documents associated with the links. The list of links may be ordered based on ranking values that are generated by search component 305 and that rate the links based on relevance.

Database component 310 may store an index of web documents. The web documents may have been previously downloaded and stored in database component 310 from resources on network 140. Database component 310 may be updated as new web documents are downloaded and added to database component 310. Database component 310 may be accessed by search component 305 when responding to user search queries.

Geocoding component 315 performs geocoding functions in a manner consistent with aspects of the invention. In one implementation, geocoding component 315 may receive postal addresses from search component 305 and geocode the postal addresses to return geographic coordinate information to search component 305. In other implementations, geocoding component 315 may receive documents, such as web documents, extract postal addresses from the received documents, and geocode the extracted postal addresses.

Although geocoding component 315 is shown in conjunction with search component 305 and database component 310, geocoding component 315 may be implemented independently of these two components. Thus, geocoding component 315 could be implemented as a stand alone geocoding component. Alternatively, geocoding component 315 could be implemented in conjunction with other components, such as an advertisement component that is designed to return geo-relevant advertisements.

Operation of Geocoding Component

Geocoding component 315 may perform certain of its geocoding functions using a table relating to postal addresses, such as all U.S. postal addresses. FIG. 4 is a diagram illustrating an exemplary implementation of such a table, labeled as table 400.

Table 400 may include a number of rows 401. Each row 401 may correspond to an address or a range of addresses. Rows 401 may each include a number of field (column) values that define the address(es) associated with a particular row. As shown, the field values may be defined as state field 410, county field 411, city field 412, zip code field 413, street base name field 414, street field 415, parity value field 416, starting street number field 417, ending street number field 418, starting latitude value field 419, starting longitude value field 420, ending latitude value field 421, and ending longitude value field 422.

State field 410, county field 411, city field 412, and zip field 413 describe the state, county, city, and zip code with which the address(es) defined by the row is associated. Street base name field 414 may define the base portion of the street with which the row is associated. The base portion may include just the "unique" portion of the street name and not include common street descriptive information such as road, street, parkway, etc. Street field 415 may include the complete street name. Parity field 416 may be used to store whether address(es) in the particular row includes just odd or even numbers. For many blocks of street addresses, buildings are numbered consecutively but use only odd or even numbers. Parity field 406 indicates whether the street numbering system uses odd or even numbers. A parity value of "0", for example, might represent even numbers and a value of "1" might represent odd numbers.

Each row 401 may define more than a single address. Starting street number field 417 lists the beginning (lower) street number in the range covered by a particular row 401. Ending street number field 418 lists the ending (highest) street number in the range covered by a particular row 401. Starting latitude field 419 and starting longitude field 420 together define a geographic coordinate for the address defined by starting street number field 417 of the row. Similarly, ending latitude field 421 and ending longitude field 422 together define a geographic coordinate for the address defined by ending street number field 418 of the row.

Exemplary values for one of rows 401 are shown in FIG. 4. This row includes the values: CA (field 410), Santa Clara (field 411), Mountain View (field 412), 94043 (field 413), Bayshore (field 414), Bayshore Pkwy (field 415), 0 (even parity) (field 416), 2100 (field 417), 2640 (field 418), 37.422710 (field 419), −122.094522 (field 420), 37.427439 (field 421), and −122.099373 (field 422).

Table 400 may include rows that may collectively cover addresses for a large geographical area, such as all postal addresses in the United States. Accordingly, table 400 may be a relatively large table.

Figure 5:
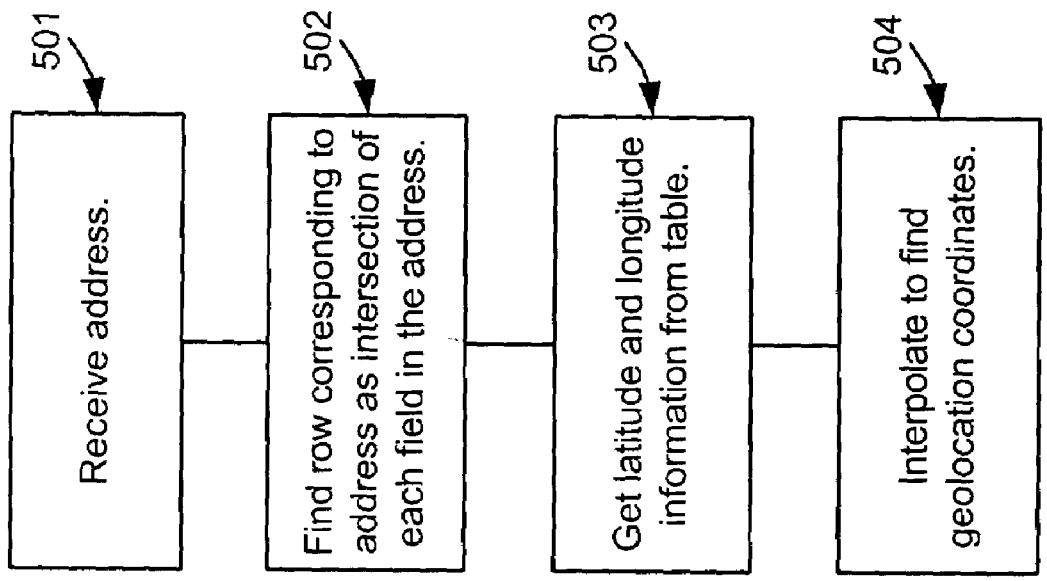
FIG. 5 is a flow chart illustrating operations consistent with the present invention for geocoding addresses.

FIG. 5 is a flow chart illustrating operations consistent with the present invention for geocoding addresses. Geocoding component 315 may begin by receiving a postal address to geocode (act 501). The address may be specified as a number of terms that correspond to certain ones of the fields in table 400 (e.g., state, county, city, zip code, street name, street number). Each term in the address corresponds to a subset of the rows of table 400. The row corresponding to the complete address can be found as the intersection of each specified subset (act 502). As an example of finding the intersection of a number of address fields, consider the address "2400 Bayshore Pkwy, Mountain View, Calif.". Geographic component 315 may first determine the three sets of rows: (1) the set of rows with street (field 415) equal to "Bayshore Pkwy," (2) the set of rows with city (field 412) equal to "Mountain View," and (3) the set of rows with state (field 410) equal to "CA." Geocoding component 315 then intersects these three sets of rows, with the resultant rows corresponding to "Bayshore Pkwy, Moutain View, Calif." From within these resultant rows, geocoding component 315 may find the one row containing street number 2400. The intersection operation used to find the intersection of the specified address fields can be performed efficiently. In one implementation, table 400 is stored such that it is sorted by columns 410–418 in the sorting order: state field 410, county field 411, city field 412, zip code field 413, street base name field 414, street field 415, parity field 416, starting street number field 417, and ending street number field 418, where state field 410 is the primary sorting key, county field 411 is the secondary sorting key, and so on. By sorting in this manner, each set of rows that are used to perform the intersection can be specified by a relatively few "blocks" of rows.

In the example of "2400 Bayshore Pkwy, Mountain View, Calif.", the set of rows with state name "CA" in field 410 is a single block, since table 400 is primarily sorted by field 410. The set of rows with city name "Mountain View" in field 412 can be specified by multiple blocks (such as a few dozen) blocks, with one block per each of the cities in the U.S. with the name "Mountain View." Since each set is specified by a relatively few "blocks" of rows, the intersection of sets may be performed very efficiently.

Implementations consistent with principles of the invention can also reduce the size of table 400. For example, instead of filling in column 401 (state name) for every row in table 400, geocoding component 315 can just record for each state name its starting row number and ending row number.

Geocoding component 315 may operate to geocode incompletely specified addresses. Again, consider the example of "2400 Bayshore Pkwy, Mountain View, Calif." Although there are multiple cities in CA with the name "Mountain View," only the Mountain View city in Santa Clara County has a parkway with the name "Bayshore Pkwy." Thus, geocoding component 315 is still able to efficiently geocode this address using intersections of the sets of rows specified by the terms "Bayshore Pkwy," "Mountain View," and "CA."

After locating a row that corresponds to the received address, geocoding component 315 may read the latitude and longitude information from the located row (act 503). In particular, the starting latitude and starting longitude values may be read from fields 419 and 420. The ending latitude and ending longitude values may be read from fields 421 and 422.

In some situations, geocoding component 315 may also receive a particular street number with the postal address, for example, "2400" in the address "2400 Bayshore Pkwy, Mountain View, Calif." For example, in the address given above, the street number may be specified as 2400 Bayshore Parkway. Using the street number, the starting street number specified in field 417, the ending street number specified in field 418, and the latitude and longitude pairs read in act 503, geocoding component 315 may interpolate the starting and ending latitude and longitude pairs to find a latitude and longitude pair that corresponds to the received address (act 504). In one implementation, the interpolation may be a linear interpolation. If the received address does not contain a particular street number, geocoding component 315 may simply use, for example, an average of the starting and ending latitude/longitude pairs as the output latitude/longitude pair.

In the implementations discussed above, geocoding component 315 receives a postal address to geocode (act 501). This address may be acquired in a number of ways, such as extracting the addresses from documents or receiving them from address fields of online or offline forms. In one exemplary implementation, the addresses may be extracted from text, such as text from web pages. The addresses may be extracted by geocoding component 315, search component 305, or other components.

Figure 6:
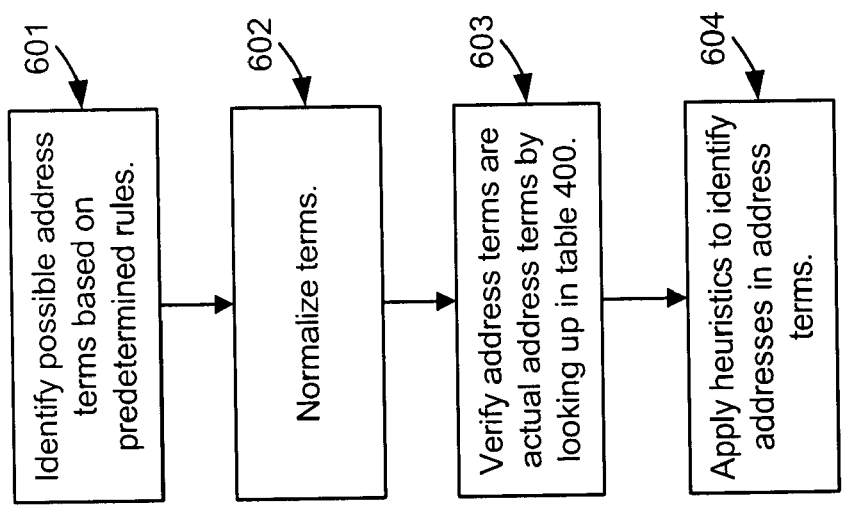
FIG. 6 is a flow chart illustrating exemplary operations for extracting addresses from text documents.

FIG. 6 is a flow chart illustrating exemplary operations for extracting addresses from text documents. To begin, a text document may be analyzed to locate strings (possible address terms) that refer to possible location names, zip codes, or phone numbers (act 601). These strings may be identified based on a number of predetermined address rules. One set of such rules may be a comparison of the strings in the document to a list of possible address terms. For example, a county name should be followed by the word county. Street names are generally identified by terms such as "street," "road," "drive," "parkway," "pkwy," etc. In addition to a straight textual matching to determine whether a string is an address term, geocoding component 315 may look for capitalization that is consistent with a written address. For example, geocoding component 315 may require that street and city names be capitalized. Still further, street names may be required to be preceded by a number, e.g., "2500 Bayshore Pkwy." Zip codes may be identified as five-digit strings and potential phone numbers may be identified as three digits followed by seven digits or three digits, followed by three digits, followed by four digits.

The initial set of strings determined in Act 601 may be normalized to standardize the address terms (act 602). A table of abbreviations, such as the United States Postal Service (USPS) table of street abbreviations may be used to normalize the terms. In the normalization process, abbreviations are converted to a single representation. For example, "Sreet." may be converted to "St" and "Parkway" and "Pky" are converted to "Pkwy."

Geocoding component 315 may lookup the normalized address terms in table 400 (act 603). Address fields that are not in table 400 may be discarded. In some situations, street prefix/suffixes are occasionally either wrong or omitted in written addresses. To deal with these addresses, geocoding component 315 may only lookup the base name of streets in table 400. Thus, the street name "Bayshore Pkwy" may be looked-up as "Bayshore."

Once candidate address terms are identified in Acts 601–603, heuristics may be applied to combine candidate addressterms into true addresses, which may then be verified by looking up in table 400 (act 604). In general, the heuristics may relate to the relative positioning of the address terms. For example, a city name should be followed by a state or a zip code, such as "Mountain View, Calif." or "Mountain View, 94043." As another example, a street name should be followed, within a certain number of characters, by a city, state, or zip code term. This allows for terms such as floor or suite numbers to be between the street name and the city, state, or zip code. For example, the address:

1200 Abernathy Road
600 Northpark Town Center
Suite 1700
Atlanta, Ga. 30328 includes two lines of address terms between the street number and the state. In general, one of ordinary skill in the art will recognize that other heuristically-generated rules could be applied to determine if a set of address terms define a valid address.

The addresses located by geocoding component 315 in the text documents are particularly suited to being converted to geographic coordinate information using the above-described techniques as these techniques can operate on partial addresses and are efficient.

In some situations, such as in web directory listings, a number of addresses may be listed for a certain city or other geographic area. For example, a restaurant guide may list a number of restaurants in a requested city. Although the requested city may be listed at the top of the restaurant guide (e.g., "Restaurant Listings For Mountain View"), each particular restaurant address may not explicitly include the city, as it is assumed that the reader will know that all the restaurants are in the same city (e.g., Mountain View). In these situations, geocoding component 315 may associate each address with the city listed near the top of the web page. Additionally, phone numbers given for each of the restaurants may be used to further infer the correct city for the restaurants.

CONCLUSION

Geocoding component 315, as described above, may perform a number of geographic relevance related functions, such as extracting postal addresses from text documents and geocoding postal addresses. A table may be used by geocoding component 315 when geocoding addresses. The table includes a number of rows, each corresponding to one or more addresses. Geocoding component 315 can quickly locate a particular row based on a number of input address fields as the intersection of the sets of rows that correspond to each of the address fields.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, certain of the acts performed in FIGS. 5 and 6 may be performed in parallel or in a different order.

No element, act, or instruction used in the description of the present application should be construed as critical or essential to the invention unless explicitly described as such. Also, as used herein, the article "a" is intended to include one or more items. Where only one item is intended, the term "one" or similar language is used.

What is claimed is:

1. A method for generating geographic coordinate information comprising:
   receiving a plurality of address terms;
   identifying, in a table that includes a plurality of rows that each include a plurality of address fields, an intersection of a plurality of sets of rows defined based on the plurality of address terms, the plurality of address terms corresponding to the address fields; and
   reading geographic coordinate information from the table at the intersection of the plurality of sets of rows in the table.

2. The method of claim 1, wherein reading the geographic coordinate information includes:
   reading starting geographic coordinate values from the table;
   reading ending geographic coordinate values from the table;
   reading a starting street number from the table;
   reading an ending street number from the table; and
   calculating the geographic coordinate information based on an interpolation of an actual street number relative to the starting and ending street numbers and the starting and ending geographic coordinate values.

3. The method of claim 1, wherein columns of the table correspond to the plurality of address fields.

4. The method of claim 3, wherein the plurality of address fields in the table include at least a state field, a city field, a zip code field, and a street field.

5. The method of claim 1, wherein the coordinate information is defined as latitude and longitude values.

6. The method of claim 1, wherein the intersection of the plurality of sets of rows in the table is determined by successively locating first sets of rows corresponding to one of the plurality of address terms and then locating a next set of rows as a subset of the first set of rows corresponding to a next one of the plurality of address terms.

7. The method of claim 6, wherein the table is successively sorted by a plurality of table columns, the sorting being performed in a sorting order based on an order of the fields used to locate the sets of rows.

8. The method of claim 7, wherein sections of the sorted columns of the table are stored as a value and an associated beginning and ending row of the value to thereby reduce a stored size of the table.

9. The method of claim 1, wherein the receiving the plurality of address terms includes:
   extracting an address from a text document.

10. The method of claim 9, wherein extracting the address from the text document further includes:
    identifying possible address terms in the text document based on predetermined rules,
    verifying that the identified possible address terms are address terms by comparing the address terms to fields in the table, and
    examining a relative position of the verified possible address terms in the document to determine whether the verified possible address terms form a valid address.

11. A device comprising:
    means for receiving a plurality of address terms;
    means for accessing a table including a plurality of rows that each include a plurality of address fields, the plurality of terms that specify the address corresponding to the address fields and defining a plurality of sets of rows in the table, the means for accessing the table including means for locating an intersection of the plurality of sets of rows in the table; and
    means for reading geographic coordinate information from the table at the intersection of the plurality of sets of rows in the table.

12. The device of claim 11, wherein the means for receiving further comprises:
    means for identifying possible address terms from a document based on predetermined rules;
    means for verifying that the identified possible address terms are address terms by comparing the address terms to the table; and
    means for examining a relative position of the verified possible address terms in the document to determine whether the verified possible address terms form a valid address.

13. A system for geocoding postal addresses comprising:
    a table including a plurality of rows that each correspond to a range of one or more addresses, each of the rows including a plurality of fields that define the row; and
    a geocoding component configured to generate geographic coordinate information for a received address specified by one or more terms that correspond to the fields by locating at least one row in the table that corresponds to an intersection of a number of sets of rows defined by the terms in the received address.

14. The system of claim 13, wherein the geographic coordinate information is generated by interpolating a street address within a range of street addresses specified in the at least one row.

15. The system of claim 13, wherein the plurality of fields include a state field, a zip code field, and a street field.

16. The system of claim 15, wherein the plurality of fields further include a county field, a city field, a street base name field, and a parity field.

17. The system of claim 16, wherein the plurality of fields further include a starting street number field, an ending street number field, starting geographic coordinate information fields, and ending geographic coordinate information fields.

18. The system of claim 13, wherein columns of the table correspond to the plurality of fields.

19. The system of claim 13, wherein the geographic coordinate information is defined as latitude and longitude values.

20. A method for extracting addresses from a document, the method comprising:
    identifying possible address terms based on predetermined rules;
    verifying that the identified possible address terms are address terms by comparing the address terms to a table containing known addresses; and examining a relative position of the verified possible address terms in the document to determine whether the verified possible address terms form a valid address.

21. The method of claim 20, wherein the predetermined rules include a comparison of the possible address terms to a known list of possible terms.

22. The method of claim 20, wherein the predetermined rules include a comparison of capitalization in the possible address terms to capitalization consistent with actual address terms.

23. The method of claim 20, wherein the predetermined rules include a verification that the possible address terms that define street names are preceded by a number.

24. The method of claim 20, further comprising normalizing the possible address terms to a standardized set of address terms.

25. The method of claim 20, further comprising:
omitting prefixes and suffixes when verifying that the identified possible address terms are address terms.

26. A computing device comprising:
a memory configured to store a table containing valid addresses; and
a processor operatively coupled to the memory, the processor executing programming instructions that cause the processor to extract addresses from a document by:
identifying possible address terms in the document based on predetermined rules,
verifying that the identified possible address terms are address terms by comparing the address terms to the table, and
examining a relative position of the verified possible address terms in the document to determine whether the verified possible address terms form a valid address.

27. The method of claim 1, wherein the plurality of address terms comprise one or more of a state name, a zip code, a city name, a street name, or a street number.

28. A computing system comprising:
at least one processor; and
a memory coupled to the at least one processor, the memory including a table including a plurality of rows that each include a plurality of address fields and instructions for execution by the at least one processor, the instructions including:
instructions configured to identify a plurality of possible address terms based on predetermined rules;
instructions configured to verify that the identified possible address terms are address terms by comparing the address terms to the table;
instructions configured to examine a relative position of the verified possible address terms in the document to determine whether the verified possible address terms form a valid address;
instructions configured to identify, when the verified possible address terms form a valid address, an intersection of a plurality of sets of rows in the table in which each set of rows in the table is defined based on one or more of the verified possible address terms; and
instructions configured to read geographic coordinate information from the table at the intersection of the plurality of sets of rows in the table.

* * * * *